(12) United States Patent　　(10) Patent No.: US 7,739,719 B2
Shafer et al.　　(45) Date of Patent: Jun. 15, 2010

(54) ALL-PASS NETWORK FOR DATA TRANSMISSION OVER A CATV SYSTEM

(75) Inventors: Steven K. Shafer, Chittenango, NY (US); Raymond Palinkas, Canastota, NY (US); Ahmet Burak Olcen, Syracuse, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 1689 days.

(21) Appl. No.: 10/910,234

(22) Filed: Aug. 3, 2004

(65) Prior Publication Data

US 2006/0031911 A1　　Feb. 9, 2006

(51) Int. Cl.
*H04N 7/16* (2006.01)
(52) U.S. Cl. .................. 725/149; 725/148; 725/150
(58) Field of Classification Search .......... 725/148–150
See application file for complete search history.

(56) References Cited

U.S. PATENT DOCUMENTS

| | | |
|---|---|---|
| 3,832,647 A | 8/1974 | Beurrier |
| 3,849,744 A | 11/1974 | Puruya |
| 3,868,604 A | 2/1975 | Tongue |
| 5,185,793 A | 2/1993 | Marland et al. |
| 5,432,562 A | 7/1995 | Van De Waterlaat et al. |
| 5,666,365 A | 9/1997 | Kostreski |
| 5,805,983 A | 9/1998 | Naidu et al. |
| 6,725,462 B1 | 4/2004 | Kaplan |

FOREIGN PATENT DOCUMENTS

WO　　WO 01/50600　　7/2001

OTHER PUBLICATIONS

P. Bowron et al.; A Gain-Compensated Active Circuit for Higher-Frequency Delay Equalisation; Conference Proceedings 1998; pp. 363-367.
International Search Report for PCT Application No. PCT/US2005/026584; Filed Jul. 27, 2005; Date of Completion Feb. 15, 2006; Date of Mailing Feb. 28, 2006.

*Primary Examiner*—Hunter B. Lonsberry
(74) *Attorney, Agent, or Firm*—Alston & Bird LLP

(57) ABSTRACT

A cable system, and a method for configuring a path of a cable system, wherein the group delay caused by one or more amplifiers having diplex filter networks is substantially equalized over all frequencies within a predetermined band by the use of one or more all-pass delay equalizers. A method of configuring a path includes steps of determining a delay versus frequency characteristic of the path within the predetermined frequency band, and providing from one to a plurality of all-pass delay equalizers in the path, wherein a collective delay versus frequency characteristic of the all-pass delay equalizer(s) within a predetermined frequency band is a mirror image of that caused by the amplifier(s), such that all frequencies within the predetermined frequency band are delayed by substantially the same amount and hence all frequency components of a signal arrive at a receiver at substantially the same time.

16 Claims, 5 Drawing Sheets

ALL-PASS NETWORK FOR DATA TRANSMISSION OVER A CATV SYSTEM

BACKGROUND OF THE INVENTION

This invention relates to wired networks for transmission of data, and particularly relates to cable television (CATV) networks for data transmission.

Cable television (CATV) systems generally comprise a head end facility from which a plurality of trunks or main distribution lines emanate in a hub-and-spoke arrangement. Each trunk serves one or more local distribution networks each of which serves a relatively small number (e.g., about 100 to 250) of end users. Each end user is connected with one of the trunks via a feeder line that taps into the main trunk at a feeder tap location.

As CATV services have expanded from simple unidirectional services in which signals are sent only from the service provider to the end user, but not vice versa, to bidirectional services in which signals are also sent from the end users back to the service provider, the demands for high performance of the cable system have also expanded. In particular, when digital signals are sent from the end users to the service provider, it is important to maintain a low bit error rate for these signals so that the information encoded in the signals is accurately transmitted to the service provider.

One factor that can lead to higher incidence of bit errors in the return path (i.e., the path from the end user to the head end facility) of a cable system is so-called group delay, wherein one or more frequency components of the return signal arrive at the head end facility at a slightly different time than one or more other frequency components that were transmitted by the end user at the same time. Group delay can be introduced into the return path, for example, by diplex filters that are commonly employed in the distribution amplifiers of cable systems for separating the forward and return signals. Amplifiers with diplex filters inherently cause some frequencies to be delayed more or less, by tens or hundreds of nanoseconds, than other frequencies.

BRIEF SUMMARY OF THE INVENTION

The present invention addresses the above needs and achieves other advantages, by providing a cable system, and a method for configuring a path of a cable system, wherein the group delay caused by one or more diplex filter networks in a path of the system is substantially equalized over all frequencies within a predetermined band by the use of one or more all-pass delay equalizers in the path. A method of configuring a path in accordance with one embodiment of the invention includes steps of determining a collective delay versus frequency characteristic of the path within the predetermined frequency band caused by the diplex filter network(s), and providing from one to a plurality of all-pass delay equalizers in the path, wherein a collective delay versus frequency characteristic of the all-pass delay equalizer(s) within a predetermined frequency band is substantially a mirror image of that caused by the diplex filter network(s), such that all frequencies within the predetermined frequency band are delayed by substantially the same amount and hence all frequency components of a signal occupying the predetermined frequency band arrive at a receiver in the path at substantially the same time.

A cable system in accordance with an embodiment of the invention comprises a head end facility, a trunk operable to transmit signals along the trunk to and from the head end facility, a tap in the trunk, and a feeder line connected at one end to the tap, an opposite end of the feeder line being for connection to an end user's equipment. The cable system defines a forward path for signals transmitted from the head end facility to the end user and a return path for signals transmitted from the end user to the head end facility. The system includes at least one amplifier for amplifying signals transmitted from the end user to the head end facility, the amplifier(s) having diplex filter network(s) for separating forward and return signals, the diplex filter network(s) causing a delay versus frequency characteristic within the predetermined frequency band for signals transmitted over the return path. In accordance with the invention, at least one all-pass delay equalizer is provided in the return path, wherein a delay versus frequency characteristic of the all-pass delay equalizer(s) within the predetermined frequency band is substantially a mirror image of that caused by the diplex filter network(s), such that all frequencies within the predetermined frequency band are delayed by substantially the same amount and hence all frequency components of the return signals occupying the predetermined frequency band arrive at the head end facility at substantially the same time.

The system can include one or more all-pass delay equalizers in the trunk, and/or one or more of the delay equalizers in the feeder line.

In preferred embodiments of the invention, the system includes one or more amplifiers each including a receptacle for receiving a plug-in module. An all-pass delay equalizer is configured as a plug-in module for installation in the receptacle of the amplifier.

The one or more all-pass delay equalizers can comprise either passive (i.e., non-powered) or active (i.e., powered) circuits.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
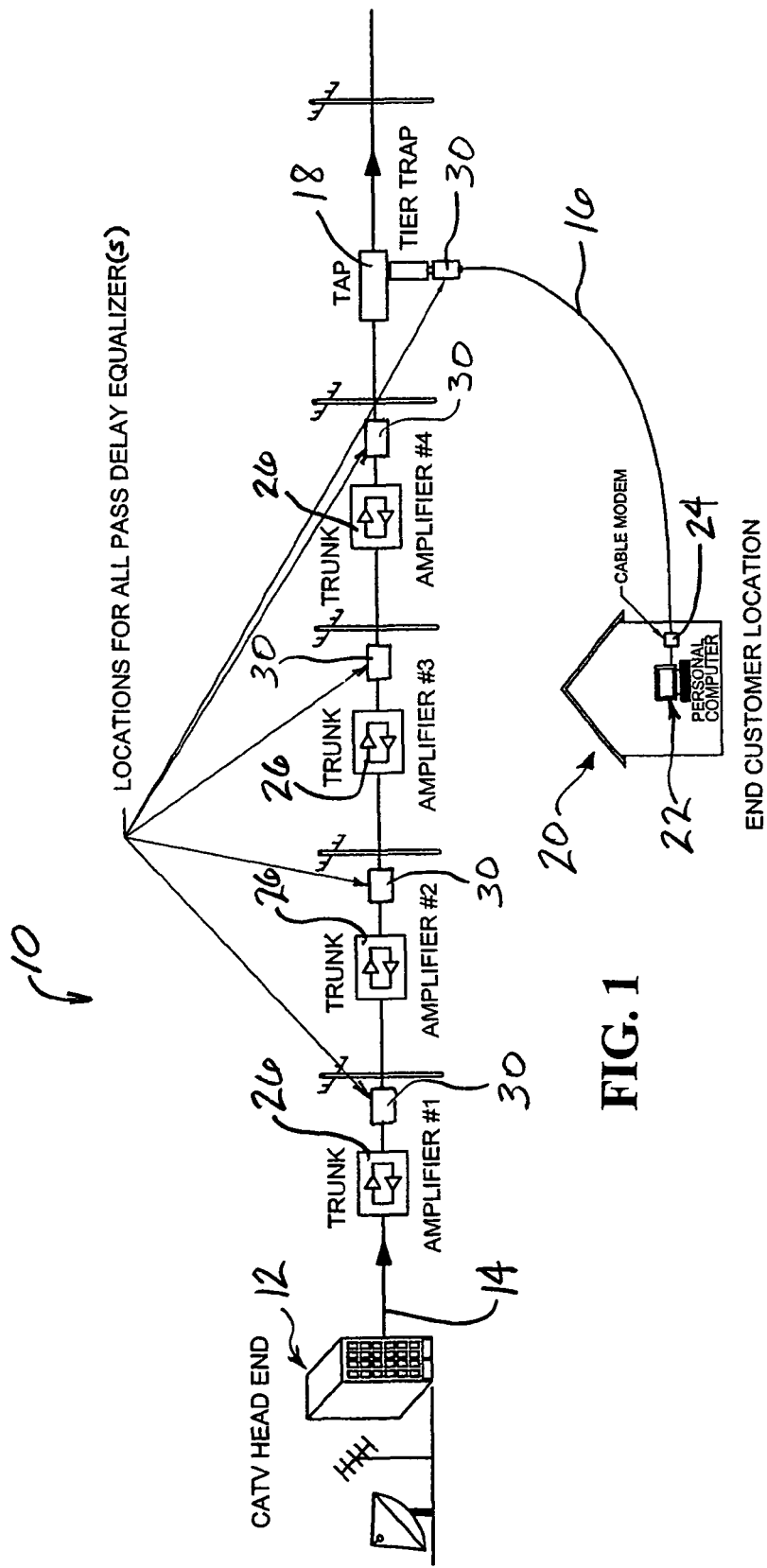
FIG. 1 is a diagrammatic depiction of a portion of a cable system in accordance with one embodiment of the invention.

FIG. 1 schematically shows a portion of a cable system 10 in accordance with one embodiment of the invention. The system includes a head end facility 12 from which emanate a plurality of main distribution lines or trunks 14 (only one shown for simplicity of illustration) in a hub-and-spoke type configuration. Typically a plurality of feeder lines 16 branch off the trunk 14 at one or more taps 18 (only one tap and feeder line shown for simplicity) for servicing a relatively small number of end users 20 in a local distribution area served by each feeder line. An end user typically will have a personal computer 22 connected to the system by a cable modem 24, or the like.

Figure 2:
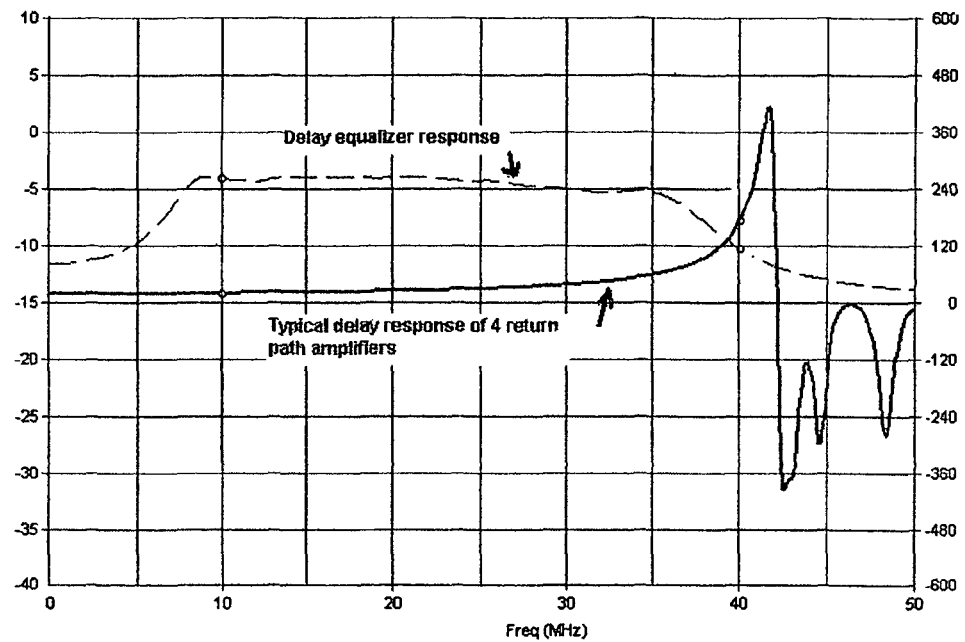
FIG. 2 is a plot of an exemplary delay versus frequency characteristic for four return path amplifiers having diplex filter networks, on which is superimposed a delay versus frequency characteristic of an all-pass delay equalizer in accordance with the invention.

The system includes one or more distribution amplifiers 26 for amplifying signals sent from the head end facility 12 to the end users 20 (referred to herein as forward signals) and for amplifying signals sent from the end users to the head end facility (referred to herein as return signals). The amplifiers typically utilize a frequency band from 10 MHz to 40 MHz, or from 10 MHz to 65 MHz, for the return signals. The amplifiers include diplex filter networks for separating the forward and return signals. Over the designated frequency band, the diplex filter networks typically do not have a constant delay versus frequency characteristic. As an example, FIG. 2 shows a delay versus frequency characteristic for four return-path amplifiers with diplex filter networks as in the system of FIG. 1. It can be seen that over the 10 MHz to 40 MHz band, the delay response is not flat. At 10 MHz the delay is about 19 ns, while at 40 MHz the delay is about 174 ns, with a non-linear variation between 10 and 40 MHz. This variation in delay over the frequency band can lead to high bit errors in the return signals.

In accordance with the invention, one or more all-pass delay equalizers 30 are included in the trunk 14 and/or in the feeder lines 16 for compensating for the non-constant delay caused by the diplex filter networks of the amplifiers. More particularly, the all-pass delay equalizers are designed with a delay versus frequency characteristic that is substantially a mirror image of that of the amplifiers with diplex filter networks. FIG. 2 shows the delay versus frequency characteristic of the all-pass delay equalizers for compensating for the characteristic of the amplifiers with diplex filter networks. At 10 MHz, the all-pass delay equalizers have a delay of about 261 ns, and at 40 MHz they have a delay of about 112 ns.

Figure 3:
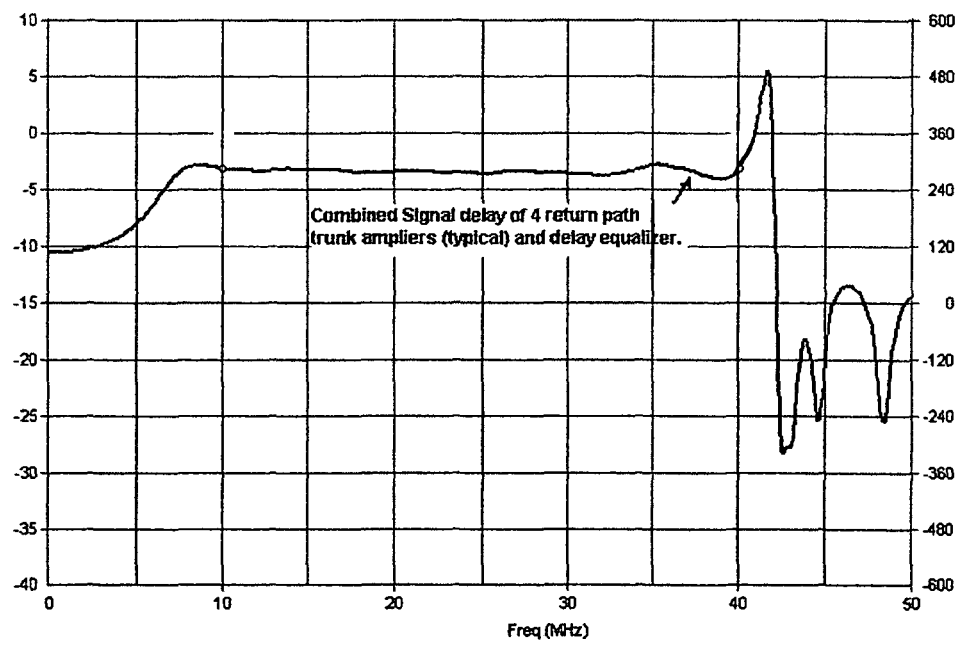
FIG. 3 is a plot of the delay versus frequency characteristic of the amplifiers and the all-pass delay equalizer combined.
Figure 4A:
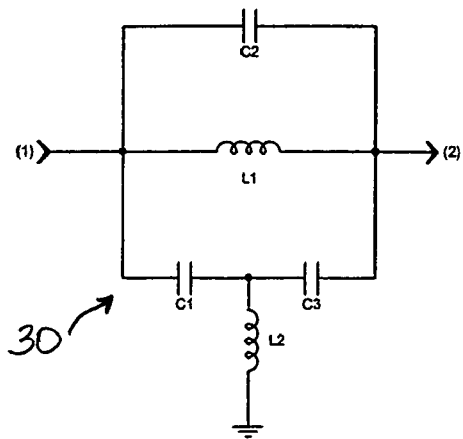
FIGS. 4A through 4F show exemplary passive all-pass delay equalizer circuits that can be used in the practice of the invention.
Figure 4B:
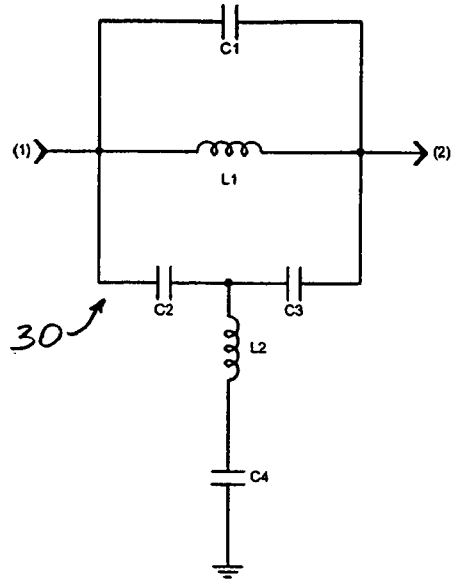
Figure 4C:
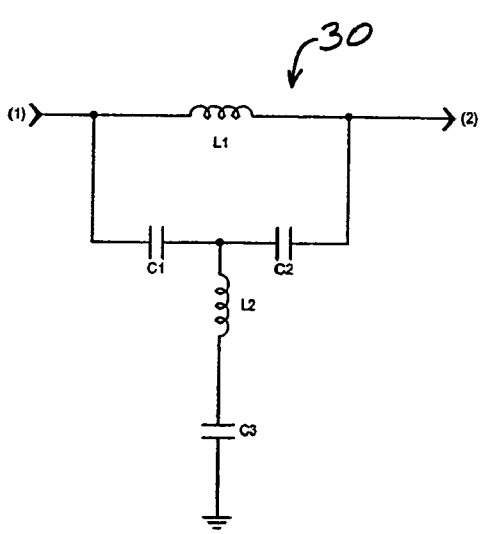
Figure 4D:
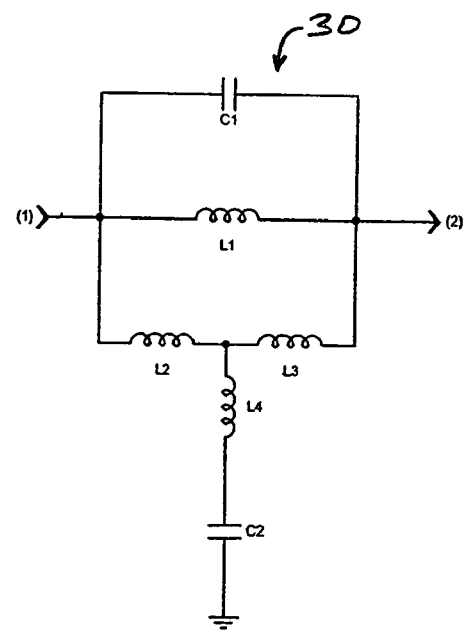
Figure 4E:
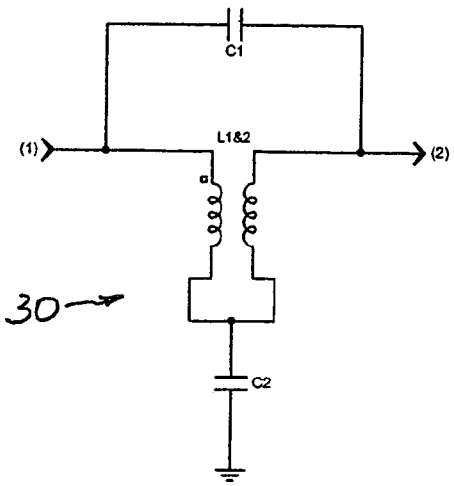
Figure 4F:
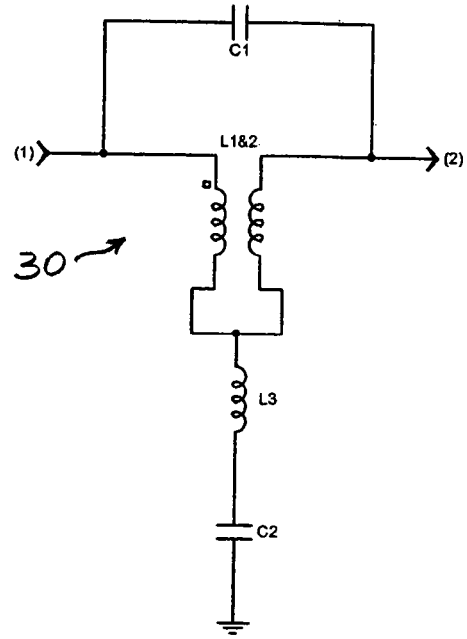

FIG. 3 shows the resulting delay of the amplifiers and all-pass delay equalizers combined. It can be seen that the delay versus frequency characteristic is essentially flat. At 10 MHz the delay is about 282 ns and at 40 MHz the delay is about 283 ns, and there is a variation of only a few nanoseconds over the entire range.

Figure 5A:
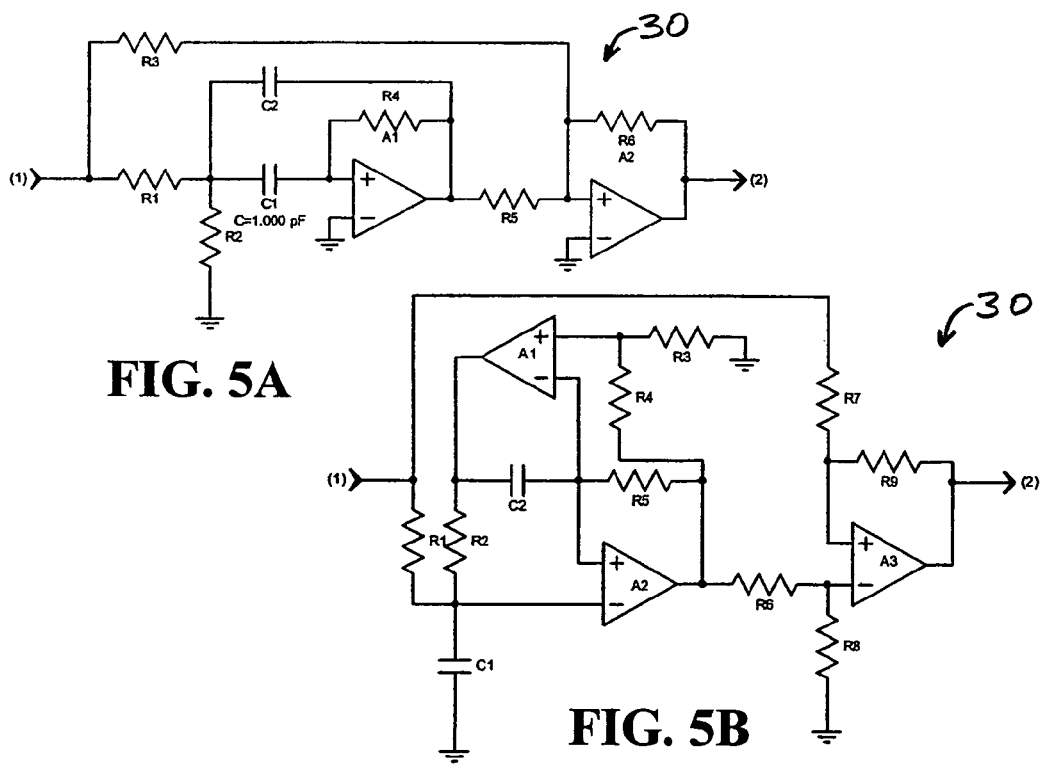
FIGS. 5A through 5C show exemplary active all-pass delay equalizer circuits that can be used in the practice of the invention.
Figure 5B:
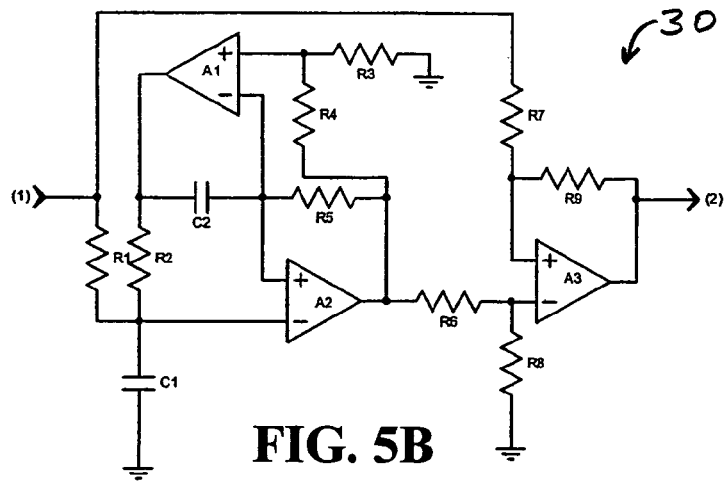
Figure 5C:
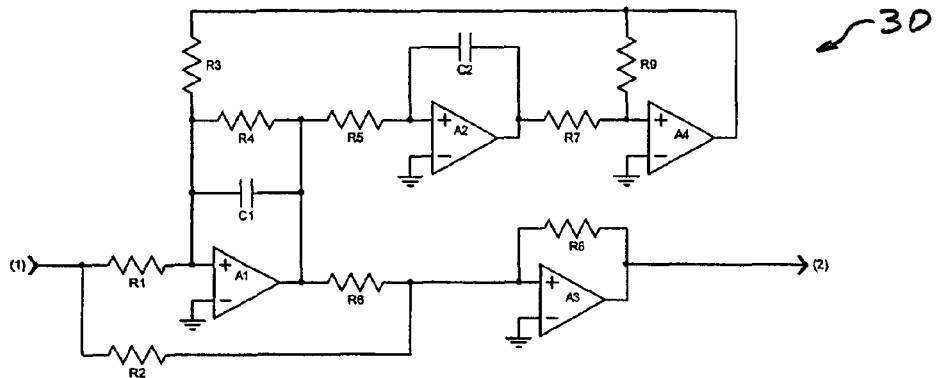

The all-pass delay equalizers that are useful in the practice of the invention can have various configurations depending on the delay specifications needed. Either passive (i.e., non-electrically powered) or active (i.e., electrically powered) equalizers can be employed. FIGS. 4A through 4F show various passive circuits that can be used, and FIGS. 5A through 5C show various active circuits that can be used. These are presented by way of example only, and other circuit designs can be used. In some cases, a single equalizer section as shown in each of FIGS. 4A-F and 5A-C may be insufficient to achieve the desired delay characteristic, and multiple sections of the same types or different types may be employed to meet the desired delay characteristic.

Figure 6:
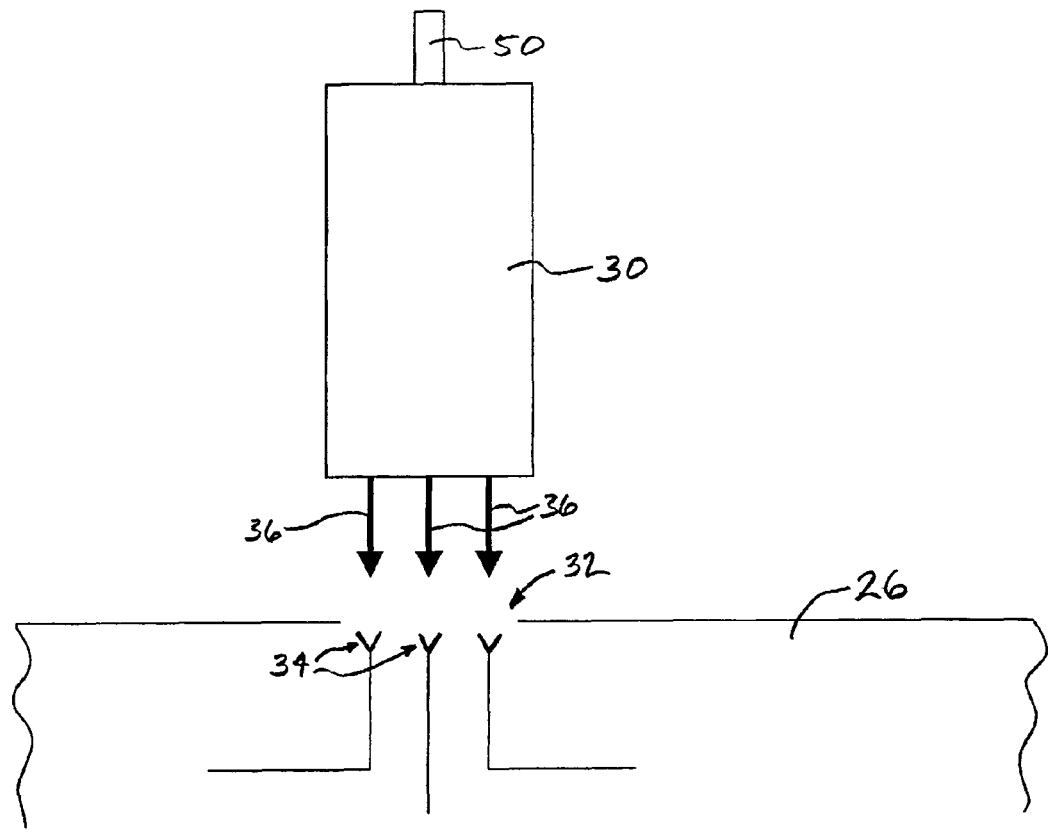
FIG. 6 is a schematic depiction of an all-pass delay equalizer configured as a plug-in module for installation in a receptacle in an amplifier in accordance with another aspect of the invention.

Another aspect of the invention relates to how the all-pass delay equalizers are incorporated into the system. Preferably, the all-pass delay equalizer 30 is configured as a plug-in module compatible with a port or receptacle that is commonly provided in the return path of many amplifier units 26 that are in general use in cable system architectures. FIG. 6 schematically depicts the all-pass delay equalizer 30 being plugged into the return path circuitry of the amplifier unit 26. In many such amplifier units 26, the return path circuitry includes one or more standardized ports, such as JXP ports (three pin receptacles arranged in-line) or SXP ports (three pin receptacles arranged in a non-linear array for receiving appropriately configured pin arrangements of plug-in modules. For example, simple flat-loss attenuator pads are sometimes plugged into the ports to tailor the overall gain of the return amplifier to a desired level, as described for instance in U.S. Pat. No. 5,990,929, the disclosure of which is incorporated herein by reference. Alternatively, thermal compensation units can be plugged into the ports to stabilize the return amplifier gain over a wide range of temperature. One type of distribution amplifier unit in common usage is the STAR-LINE® Mini-Bridger Distribution Amplifier available from General Instrument Corporation of Horsham, Pa. The STAR-LINE® amplifier includes return-path JXP ports that can be used by the all-pass delay equalizer 30 in accordance with the present invention.

FIG. 6 schematically illustrates the all-pass delay equalizer 30 being inserted into a port 32 in the amplifier unit 26. The port 32 includes three receptacles 34 for receiving three pins 36 of the all-pass delay equalizer 30. Of course, it will be recognized that various numbers, configurations, and arrangements of pins and receptacles can be used for connecting the all-pass delay equalizer into the return path circuitry of the amplifier unit. The equalizer module 30 can include a handle 50 to facilitate removal of the module from the amplifier receptacle.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for configuring a path of a cable TV system, wherein the path includes from one to a plurality of amplifiers for amplifying signals transmitted along the path to a receiver, the amplifier(s) having diplex filter network(s) for separating forward and return signals, the method comprising the steps of:

determining a collective delay versus frequency characteristic of the path within the predetermined frequency band caused by the amplifier(s) with diplex filter network(s); and providing from one to a plurality of all-pass delay equalizers in the path, wherein a collective delay versus frequency characteristic of the all-pass delay equalizer(s) within a predetermined frequency band is substantially a mirror image of that caused by the amplifier(s) with diplex filter network(s), such that all frequencies within the predetermined frequency band are delayed by substantially the same amount and hence all frequency components of a signal occupying the predetermined frequency band arrive at the receiver in the path at substantially the same time.

2. The method of claim 1, wherein the providing step comprises providing from one to a plurality of passive non-powered all-pass delay equalizers in the path.

3. The method of claim 1, wherein the providing step comprises providing from one to a plurality of active powered all-pass delay equalizers in the path.

4. The method of claim 1, wherein the path comprises a trunk that extends from a head end facility to a tap, and wherein the providing step comprises providing at least one all-pass delay equalizer in the trunk.

5. The method of claim 4, wherein a plurality of all-pass delay equalizers are provided in the trunk.

6. The method of claim 1, wherein the path comprises a trunk that extends from a head end facility to a tap, and a feeder line that extends from the tap to an end-user facility, and wherein the providing step comprises providing at least one all-pass delay equalizer in the feeder line.

7. The method of claim 6, wherein the providing step further comprises providing at least one all-pass delay equalizer in the trunk.

8. A cable system for transmitting signals having frequency components of different frequencies spanning a predetermined frequency band, the cable system comprising:
   a head end facility;
   a trunk operable to transmit signals along the trunk to and from the head end facility;
   a tap in the trunk;
   a feeder line connected at one end to the tap, an opposite end of the feeder line being for connection to an end user's equipment;
   the cable system defining a forward path for signals transmitted from the head end facility to the end user and a return path for signals transmitted from the end user to the head end facility;
   at least one amplifier in the return path for amplifying signals transmitted from the end user to the head end facility, the amplifier(s) having diplex filter network(s) for separating the signals transmitted over the forward and return paths, the diplex filter network(s) causing a delay versus frequency characteristic within the predetermined frequency band for signals transmitted over the return path; and
   at least one all-pass delay equalizer in the return path, wherein a delay versus frequency characteristic of the all-pass delay equalizer(s) within the predetermined frequency band is substantially a mirror image of that caused by the amplifier(s) with diplex filter network(s), such that all frequencies within the predetermined frequency band are delayed by substantially the same amount and hence all frequency components of the return signals occupying the predetermined frequency band arrive at the head end facility at substantially the same time.

9. The cable system of claim 8, wherein the at least one all-pass delay equalizer comprises a passive non-powered all-pass delay equalizer.

10. The cable system of claim 8, wherein the at least one all-pass delay equalizer comprises an active powered all-pass delay equalizer.

11. The cable system of claim 8, wherein the at least one all-pass delay equalizer is provided in the trunk.

12. The cable system of claim 11, wherein a plurality of all-pass delay equalizers are provided in the trunk.

13. The cable system of claim 8, wherein the at least one all-pass delay equalizer is provided in the feeder line.

14. The cable system of claim 13, further comprising at least one all-pass delay equalizer in the trunk.

15. The cable system of claim 8, wherein there are from one to a plurality of amplifiers in the trunk for amplifying signals transmitted over the return path, and wherein there are from one to a plurality of all-pass delay equalizers in the trunk, there being one said all-pass delay equalizer for each said amplifier.

16. The cable system of claim 15, wherein each all-pass delay equalizer comprises a plug-in module and each amplifier has a receptacle into which the plug-in module is installed.

* * * * *